United States Patent
Chida

(10) Patent No.: US 8,587,819 B2
(45) Date of Patent: Nov. 19, 2013

(54) PAGE LAYOUT CONTROL DEVICE, IMAGE PROCESSING APPARATUS, PAGE LAYOUT CONTROL METHOD, AND COMPUTER READABLE MEDIUM

(75) Inventor: Yoshihiro Chida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 664 days.

(21) Appl. No.: 12/852,104

(22) Filed: Aug. 6, 2010

(65) Prior Publication Data

US 2011/0205594 A1 Aug. 25, 2011

(30) Foreign Application Priority Data

Feb. 19, 2010 (JP) ................................. 2010-035395

(51) Int. Cl.
*G06F 15/00* (2006.01)
(52) U.S. Cl.
USPC ........................... 358/1.18; 715/243; 715/251
(58) Field of Classification Search
USPC .................................. 358/1.18; 715/243, 251
See application file for complete search history.

(56) References Cited

U.S. PATENT DOCUMENTS

| 6,844,940 B2 * | 1/2005 | Warmus et al. ............... 358/1.18 |
| 2004/0179223 A1 * | 9/2004 | Iwase et al. .................. 358/1.13 |
| 2006/0092453 A1 * | 5/2006 | Okada et al. ................. 358/1.14 |

FOREIGN PATENT DOCUMENTS

| JP | A-11-154071 | 6/1999 |
| JP | A-2001-246820 | 9/2001 |
| JP | A-2007-290135 | 11/2007 |

* cited by examiner

*Primary Examiner* — King Poon
*Assistant Examiner* — Lawrence Wills
(74) *Attorney, Agent, or Firm* — Oliff & Berridge, PLC

(57) ABSTRACT

A page layout control device having a receiving unit that receives booklet designation information for printing two pages on each of both sides of a recording sheet and saddle-stitching as printing information for printing on a single recording sheet; a booklet page layout processing unit that carries out page layout processing in which two pages are laid out on each of both sides of each recording sheet such that pages are collated after a booklet is created, and a trial page layout processing unit that, when printing side information for designating a printing side of the recording sheet in the booklet designation information received by the receiving unit indicates single-sided printing, carries out page layout processing.

14 Claims, 9 Drawing Sheets

FIG.5
BOOKLET, SINGLE-SIDE PRINTING DESIGNATION
(PAGE ALLOCATION FOR TRIAL PRINTING)
FIRST SHEET
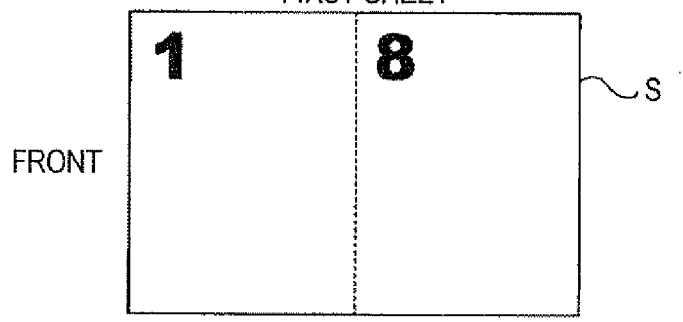
FRONT
SECOND SHEET
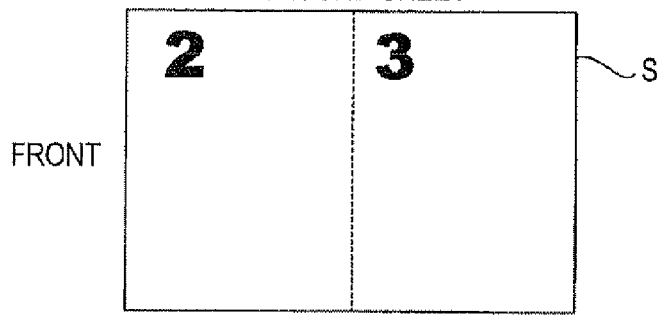
FRONT
THIRD SHEET
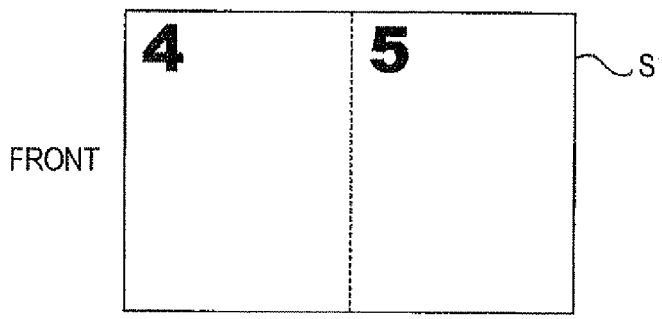
FRONT
FOURTH SHEET
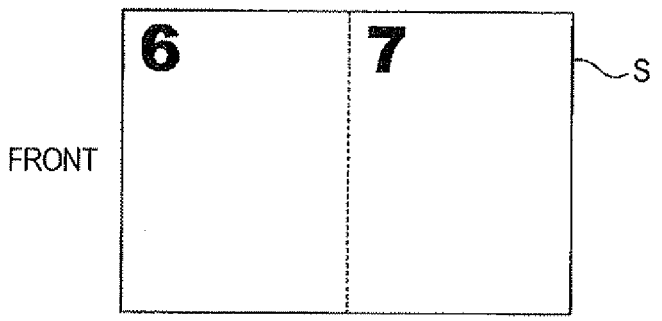
FRONT
NOT PRINTED ON REAR SIDE

PAGE LAYOUT CONTROL DEVICE, IMAGE PROCESSING APPARATUS, PAGE LAYOUT CONTROL METHOD, AND COMPUTER READABLE MEDIUM

CROSS-REFERENCE TO RELATED APPLICATIONS

This application is based on and claims priority under 35 USC 119 from Japanese Patent Application No. 2010-035395 filed Feb. 19, 2010.

BACKGROUND

Technical Field

The present invention relates to a page layout control device, an image processing apparatus, a page layout control method, and a computer readable medium.

SUMMARY

According to an aspect of the invention, there is provided a page layout control device including: a receiving unit that receives booklet designation information for printing two pages on each of both sides of a recording sheet and saddle-stitching as printing information for printing on a single recording sheet; a booklet page layout processing unit that, when printing side information for designating a printing side of the recording sheet in the booklet designation information received by the receiving unit indicates double-sided printing, carries out page layout processing in which two pages are laid out on each of both sides of each recording sheet such that pages are collated after a booklet is created; and a trial page layout processing unit that, when printing side information for designating a printing side of the recording sheet in the booklet designation information received by the receiving unit indicates single-sided printing, carries out page layout processing in which two pages laid out on at least one of both sides of each recording sheet such that left and right images on the at least one of both sides of each recording sheet coincide with an image on a corresponding double-page spread after the booklet is created.

BRIEF DESCRIPTION OF THE DRAWINGS

Exemplary embodiments of the present invention will be described in detail based on the following figures, wherein:

FIG. 5 is a front view of a recording sheet showing a page layout state at the time of trial printing with booklet designation.

DETAILED DESCRIPTION

Figure 1:
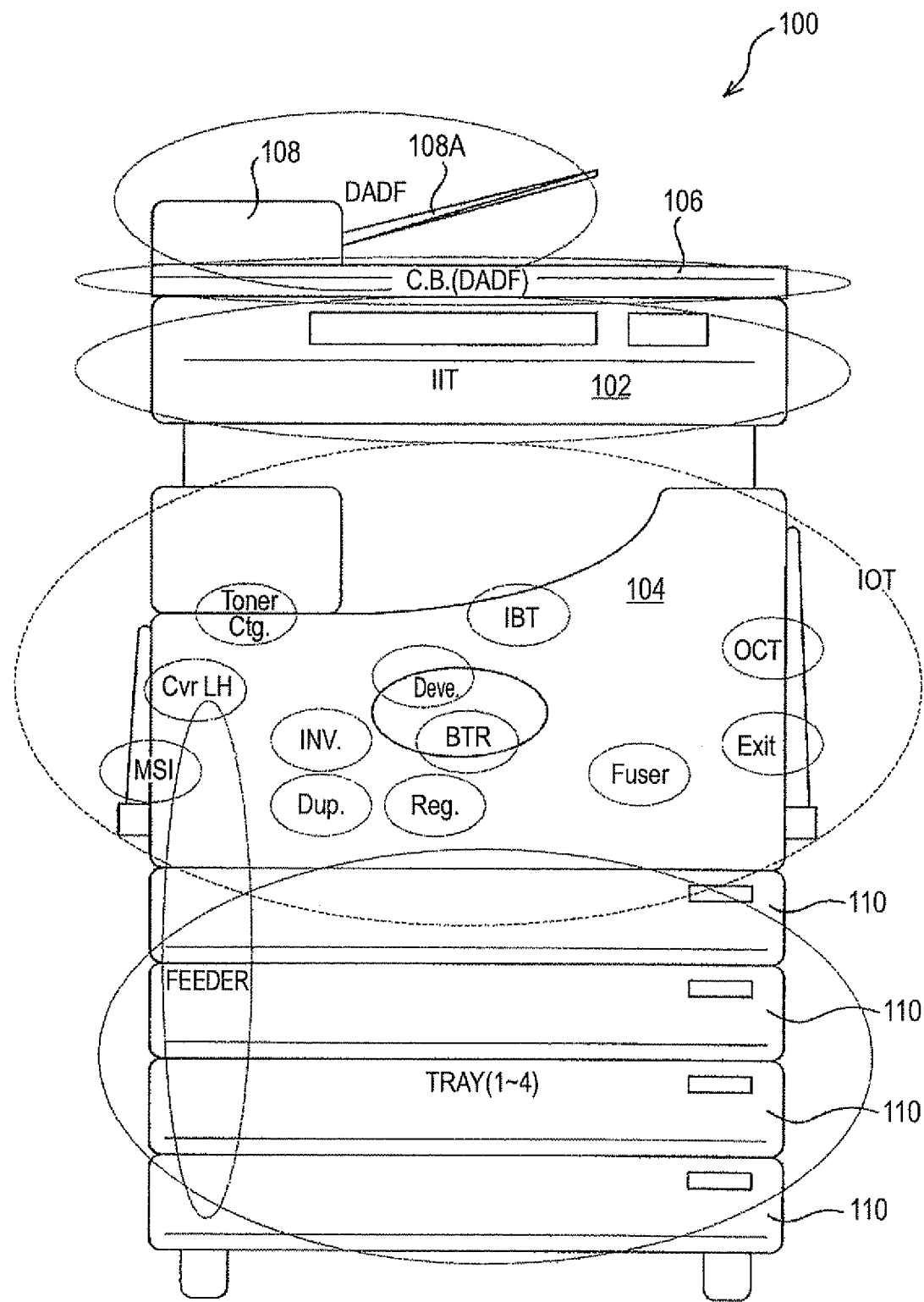
FIG. 1 is a schematic configuration diagram of an image processing apparatus according to this embodiment.

As shown in FIG. 1, an image processing apparatus 100 is primarily provided with an image reading apparatus 102 (IIT) and an image forming apparatus 104 (IOT), and forms a so-called multi-function apparatus.

In the image reading apparatus 102, in a state where a document is placed on a platen and sandwiched between the platen and a cover 106 (C.B. (DADF)), a scanner unit is operated and reads a document image by so-called line scanning to obtain image data.

An automatic document feeder 108 (DADF) is attached to the cover 106. If a document is set on a tray 108A of the automatic document feeder, and a scan instruction operation is made, the document on the tray 108A is fed to the platen one by one, such that plural sheets of the document can be automatically read.

The image processing apparatus 100 has a copy mode. When a copy instruction operation is made, the image forming apparatus 104 is operated on the basis of image data read by the image reading apparatus 102. Then, a recording sheet of a predetermined size is brought out of any one of trays 110 (TRAY 1 to 4) arranged in four stages in a vertical direction below the image forming apparatus 104 by a transport device (FEEDER), and, for example, image forming processing by an electrophotographic method is carried out to form an image on the recording sheet. When a jam or the like occurs while the recording medium is being transported, an opening/closing cover (Cvr LH) in the vicinity of the transport device is opened, such that the sheet is easily removed.

The electrophotographic method means that an optical beam which is scanned on the basis of image data is irradiated onto a photosensitive drum charged by a charging device (IBT) while rotating the photosensitive drum to form an electrostatic latent image, and a developing device (Deve) supplies a developer (generated by toner and carrier) from a toner cartridge (Toner Ctg.) to the electrostatic latent image to perform toner development. The recording sheet is fed to a transfer section (BTR) of the photosensitive drum, such that the developed toner image is transferred to the recording sheet by the transfer section.

Thereafter, the recording sheet is subjected to heating and pressurization by a fixing device (Fuser), such that the transferred image is fixed onto the recording sheet. Then, the recording sheet is discharged by a discharge device (Exit).

The image forming apparatus 104 also has a print mode. Thus, the image forming apparatus 104 is operated on the basis of image data input from a PC (Personal Computer) 132 on a network through an external interface 134 (see FIG. 2), and carries out an image forming processing operation the same as described above.

The image forming apparatus 104 includes a double-side print mechanism (Dup) for printing on both sides of the recording sheet, a registration mechanism (Reg) for color matching, a manual feed mechanism (MSI) for inserting the recording sheet from the outside of the apparatus, an inversion mechanism (INV) for inverting the orientation of the front and rear sides at the time of discharging of the recording sheet, an offset mechanism (OCT) for shifting a document to be discharged in the width direction on a job basis, and the like.

Although in FIG. 1, the image processing apparatus 100 is covered with a cover, and the above-described sections (main part) are not shown, elliptical regions surrounded by a chain line roughly represent the positions. The collation table of the abbreviations and the original names of the respective sections shown in FIG. 1 is shown in Table 1.

TABLE 1

| | Abbreviation | Name |
|---|---|---|
| 1 | DADF | Automatic Document Feeder |
| 2 | C.B. (DADF) | Cover |
| 3 | IIT | Image Reading Apparatus |
| 4 | Cvr LH | Opening/Closing Cover |
| 5 | Toner Ctg. | Toner Cartridge |
| 6 | Deve. | Developing Device |
| 7 | IBT | Charging Device |
| 8 | BTR | Transfer Device |
| 9 | Fuser | Fixing Device |
| 10 | Dup | Double-Side Print Mechanism |
| 11 | INV | Inversion Mechanism |
| 12 | Reg. | Registration Mechanism |
| 13 | Exit | Discharge Device |
| 14 | MSI | Manual Feed Mechanism |
| 15 | OCT | Offset Mechanism |
| 16 | TRAY | Tray |
| 17 | FEEDER | Transport Device |

Figure 2:
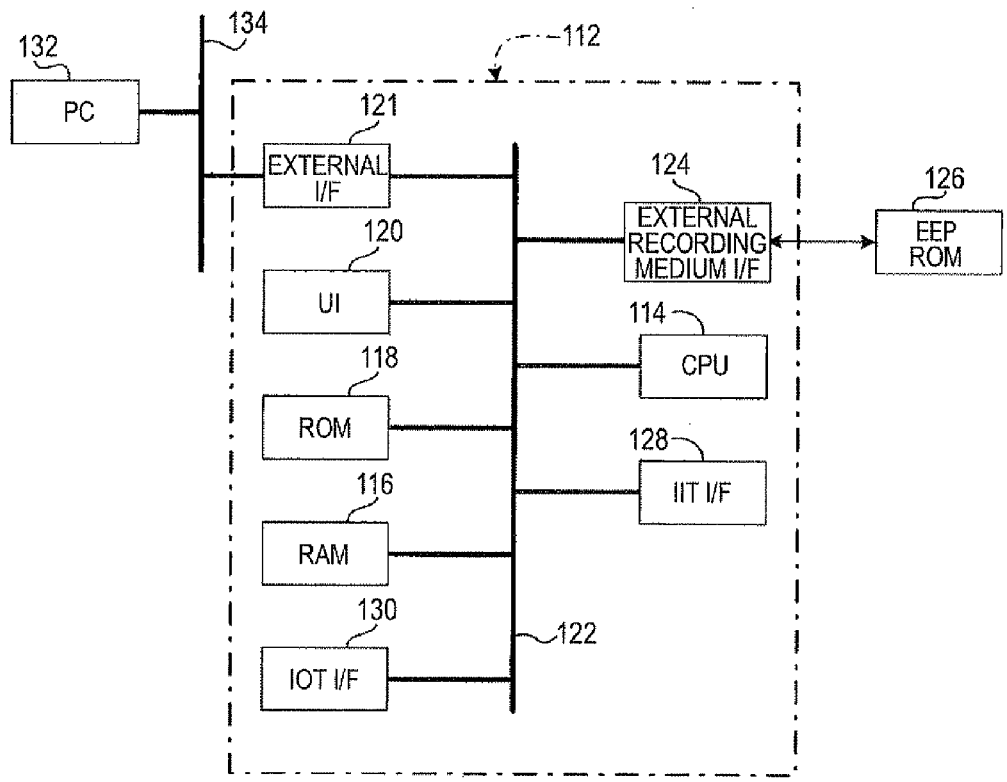
FIG. 2 is a block diagram showing a control system of the image processing apparatus according to this embodiment.

FIG. 2 is a control block diagram mainly based on image reading control and image forming control in the image processing apparatus 100.

The image processing apparatus 100 includes a main controller 112. The main controller 112 is configured such that a CPU 114, a RAM 116, a ROM 118, a UI 120, an external I/F 121 are connected to each other through a bus 122, such as a control bus or a data bus.

The PC 132 on which a printer driver for enabling the image processing apparatus 100 to be operated in the print mode is installed is connected to the external I/F 121, for example, through a communication network 134.

An external recording medium I/F 124 is connected to the bus 122. A recording medium (EEPROM) 126 is removably loaded into the external recording medium I/F 124.

An IOT I/F 128 and an IIT I/F 130 are connected to the bus 122. An IOT controller and an IIT controller (not shown) are also connected to the bus 122.

Though not shown, an interface is provided in the bus 122 and is connected to a controller for controlling the automatic document feeder 108 (see FIG. 1), a post-processing device, or the like.

Figure 3:
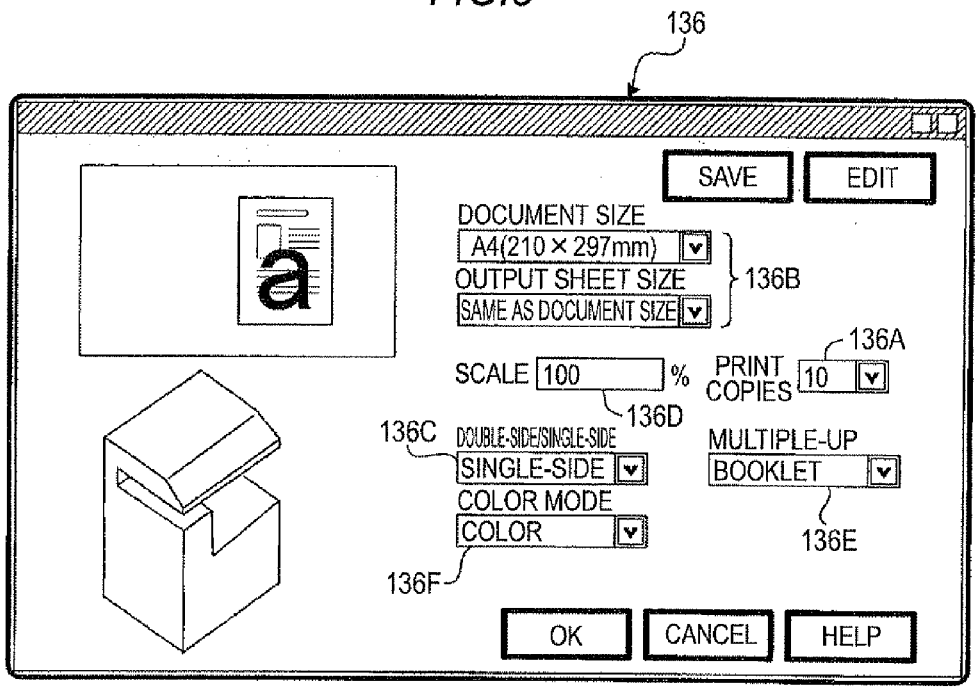
FIG. 3 is a front view of a printer driver screen displayed on a monitor of a PC that sends image data.

FIG. 3 shows an example of a printer driver screen 136 that is installed on the PC 132 and displayed on the monitor of the PC 132 at the time of printing instruction.

On the printer driver screen 136, a "print copies" setting window 136A, a "recording sheet size" setting window 136B, a "double-side/single-side" setting window 136C, a "scale" setting window 136, a "multiple-up" setting window 136E, a "color/monochrome" setting window 136F, and the like are displayed as a printing information setting screen. These are displayed so as to be individually designated as a pull-down menu screen. With regard to the display form, the window screen is not limited to a pull-down menu screen.

In this embodiment, as the print mode, the pull-down menu screen of the "multiple-up" setting window 136E has an item "booklet".

The item "booklet" normally indicates that images for two pages are respectively laid out on and printed on each side of the recording sheet by double-side printing. Then, the printed recording sheets are arranged to overlap each other, a portion between two allocated pages in each recording sheet (the center of the recording sheet) is bound by a clamp, and a so-called valley fold is carried out to create a booklet.

In this embodiment, if a "booklet" setting is made, "double-side printing" in the double-side/single-side setting window and "2-up" in the multiple-up setting window are automatically set (initial setting).

After the initial setting, in the "double-side/single-side" setting window 136E, "double-side printing" or "single-side printing" may be set (irregular setting).

Figure 4:
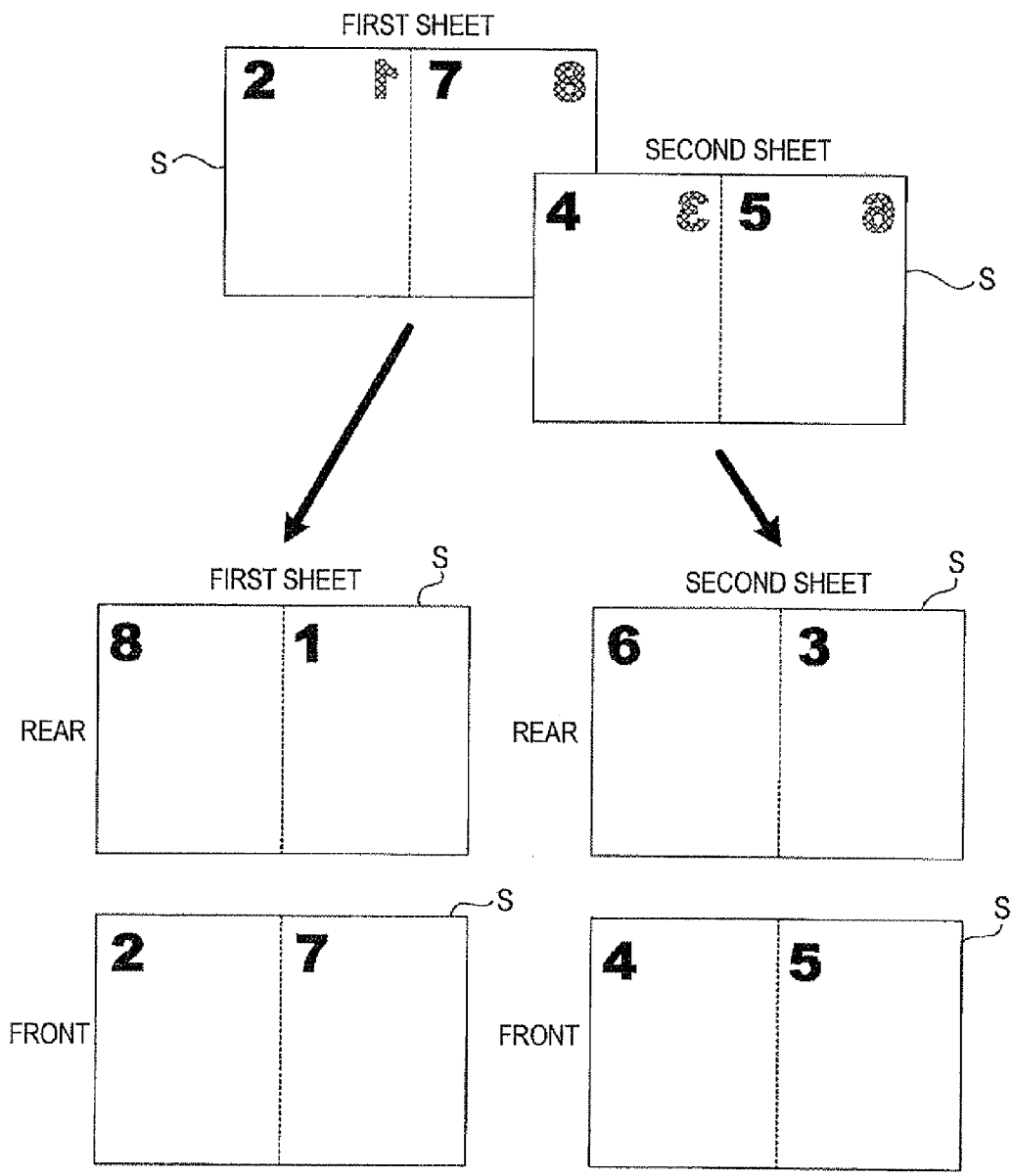
FIG. 4 is a front view of a recording sheet showing a page layout state at the time of normal booklet printing.

In the initial setting, as shown in FIG. 4, when the total number of pages is eight, in order to collate pages at the time of saddle-stitching as a booklet, an eighth page and a first page are respectively laid out on the left and right sides of the rear side of a first recording sheet S, and a second page and a seventh page are respectively laid out on the left and right sides of the front side of the first recording sheet S. Further, a sixth page and a third page are respectively laid out on the left and right sides of the rear side of a second recording sheet S, and a fourth page and a fifth page are respectively laid out on the left and right sides of the front side of the second recording sheet S.

This is generalized as follows. When the total number of pages is N (where N is a multiple of 4), in order to collate pages at the time of saddle-stitching as a booklet, the number S (=N/4) of recording sheets. Then, the N-th page and the first page are respectively printed on the left and right sides of the rear side of the first recording sheet S, and the second page and the (N−1) th page are respectively printed on the left and right sides of the front side of the first recording sheet S.

When N is equal to or greater than 8 which is a multiple of 4, the number S of recording sheets is first calculated (S=N/4), and for the S sheets, the page sequence regarding the left side of the rear side and the right side of the front side decreases every other page (−2 pages), and the page sequence regarding the left side of the front side and the right side of the rear side increases every other page (+2 pages).

In contrast, the irregular setting is intended for trial printing before a booklet is printed and for confirmation in a state where a binding step is not carried out to create a booklet, for example, the printed recording sheets are arranged in parallel on the desk. It is not necessary to turn over the recording sheets on the desk, and all the images can be viewed.

Since "single-side printing" is set, the image recording sides which are divided into the "front side" and the "rear side" by the initial setting are all one side (front side). In this case, for example, images of eight pages are individually printed on four recording sheets.

In this embodiment, when a "single-side" setting is made after "booklet" destination, a specific alert (notification, such as message display) is provided to a user, and after permission (confirmation), printing is carried out with page layout different from at the time of a booklet (double-side).

In the case of a booklet (single-side), "front cover" and "rear cover" are excluded, and page layout is carried out such that the spread left and right pages when the booklet is created are continued.

That is, as shown in FIG. 5, when the total number of pages is eight, the first page and the eighth page are respectively laid out on the left and right sides of the front side of the first recording sheet S, and subsequently the second page and the third page are respectively laid out on the left and right sides of the front side of the second recording sheet S such that the pages are continued for each sheet. Further, the fourth page and the fifth page are respectively laid out on the left and right sides of the front side of the third recording sheet S, and the sixth page and the seventh page are respectively laid out on the left and right sides of the front side of the fourth recording sheet S.

This is generalized as follows. When the total number of pages is N (where N is a multiple of 4), the number S (=N) of recording sheets is set. Then, the first page and the N-th page are respectively laid out on the left and right sides of the front side of the first recording sheet S, the second page and the third page are respectively laid out on the left and right sides of the front side of the second recording sheet S, and subsequently the (N−2)th page and the (N−1)th page are respectively laid out on the left and right sides of the front side of the S-th recording sheet S.

Figure 6:
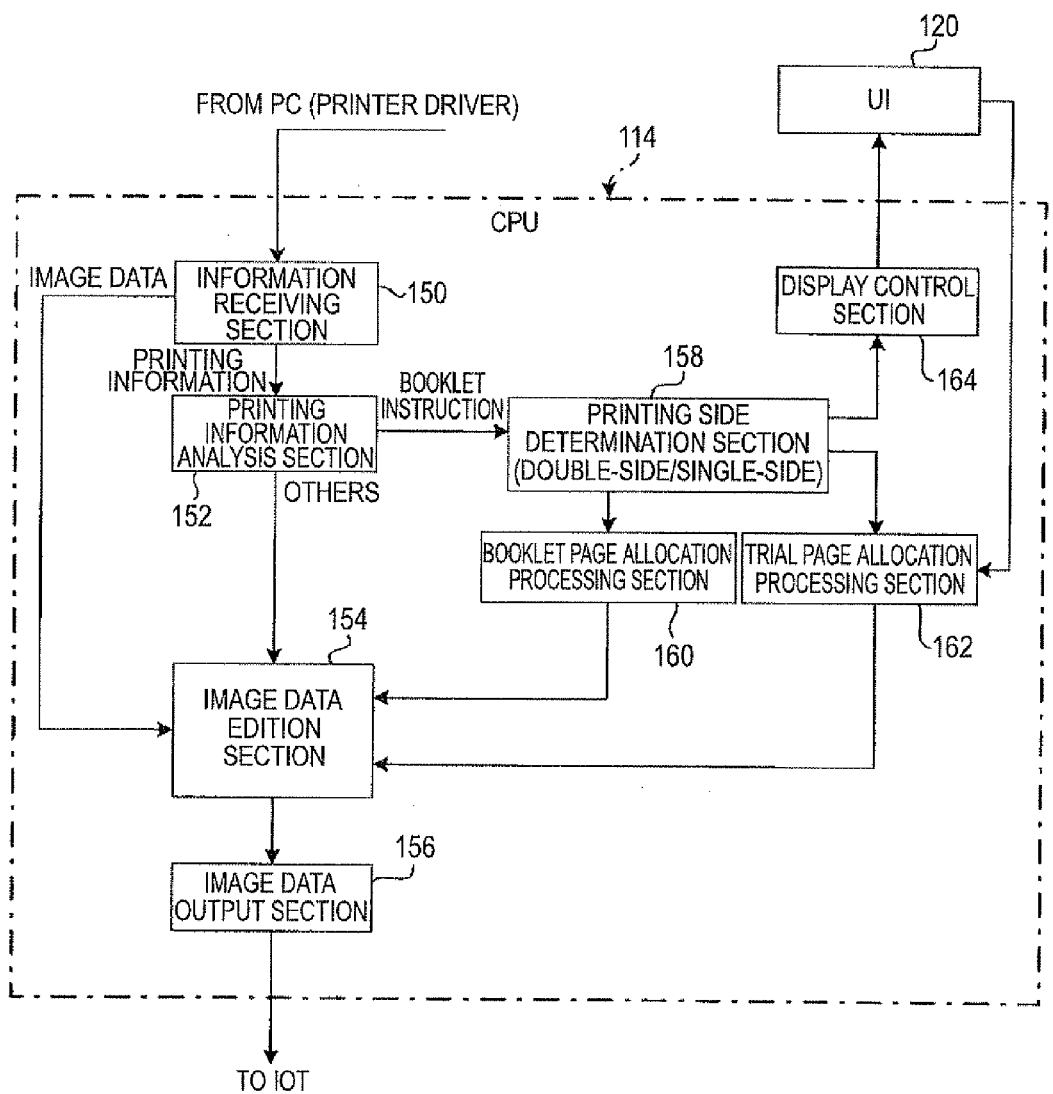
FIG. 6 shows a functional block for performing control of image processing including page layout based on received image data and printing information.

FIG. 6 is a block diagram functionally showing image processing control based on a printing instruction in the CPU 114 (see FIG. 2).

Printing information set by the printer driver of the PC 132 is received by an information receiving section 150, together with image data. The information receiving section 150 is connected to a printing information analysis section 152 and an image data edition section 154.

The information receiving section 150 separates the printing information from image data, and the printing information is sent to the printing information analysis section 152. Further, image data is sent to the image data edition section 154.

The printing information analysis section 152 analyzes setting information in the "print copies" setting window 136A, the "recording sheet size" setting window 136B, the "double-side/single-side" setting window 136C, the "scale" setting window 136D, the "multiple-up" setting window 136E, and the "color/monochrome" setting window 136F shown in FIG. 3.

The printing information analysis result is basically sent to the image data edition section 154. The image data edition section 154 imposes image data on the basis of the printing information analysis result or determines the print copies and sends the print copies to an image data output section 156.

The image data output section 156 carries out, for example, image correction (gamma correction, sharpness correction, color correction, and RIP (Raster Image Processor)) processing and sends the processing result to the IOT.

When "booklet" in the "multiple-up" setting window 136E is instructed by the printing information analysis section 152, a booklet designation signal and information set in the "double-side/single-side" setting window 136C of the printing information are sent from the printing information analysis section 152 to a printing side determination section 158.

The input of the booklet designation signal causes the printing side determination section 158 to be activated, and the printing side determination section 158 determines the setting information of the "double-side/single-side" setting window 136C that is received simultaneously with the booklet designation signal.

A booklet page layout processing section 160, a trial page layout processing section 162, and a display control section 164 are connected to the printing side determination section 158.

When the printing side determination section 158 determines to be "double-side", an activation signal is sent to the booklet page layout processing section 160. When receiving the activation signal, the booklet page layout processing section 160 carries out page layout processing (see FIG. 4) when a normal booklet is created, and allocated page information is sent to the image data edition section 154.

Meanwhile, when the printing side determination section 158 determines to be "single-side", an activation signal is sent to the trial page layout processing section 162 and the display control section 164.

The display control section 164 controls a monitor section of the UI 120 to display a message, "Want to carry out trial printing on a single side before booklet printing? Y→1/ N→0". When the PC 132 is remotely located, the same message may be notified to the PC 132 and displayed on the monitor of the PC 132.

An operation section of the UI 120 is connected to the trial page layout processing section 162. For this reason, a response operation (Y→1/N→0) based on the message is input to the trial page layout processing section 162 through the operation section. With regard to the response operation, it is assumed that the input of "1" is H signal, and the input of "0" is L signal. The response operation may be made on the PC 132.

The trial page layout processing section 162 is configured to take the logical product (AND) of the activation signal (H signal) from the printing side determination section 158 and the response operation signal (H signal/L signal) from the UI 120 or the PC 132. When the activation signal and the response operation signal are H signals, page layout processing (see FIG. 5) at the time of trial printing of booklet is carried out, and allocated page information is sent to the image data edition section 154.

Hereinafter, the operation of this embodiment will be described with reference to flowcharts of FIGS. 7 to 9.

Figure 7:
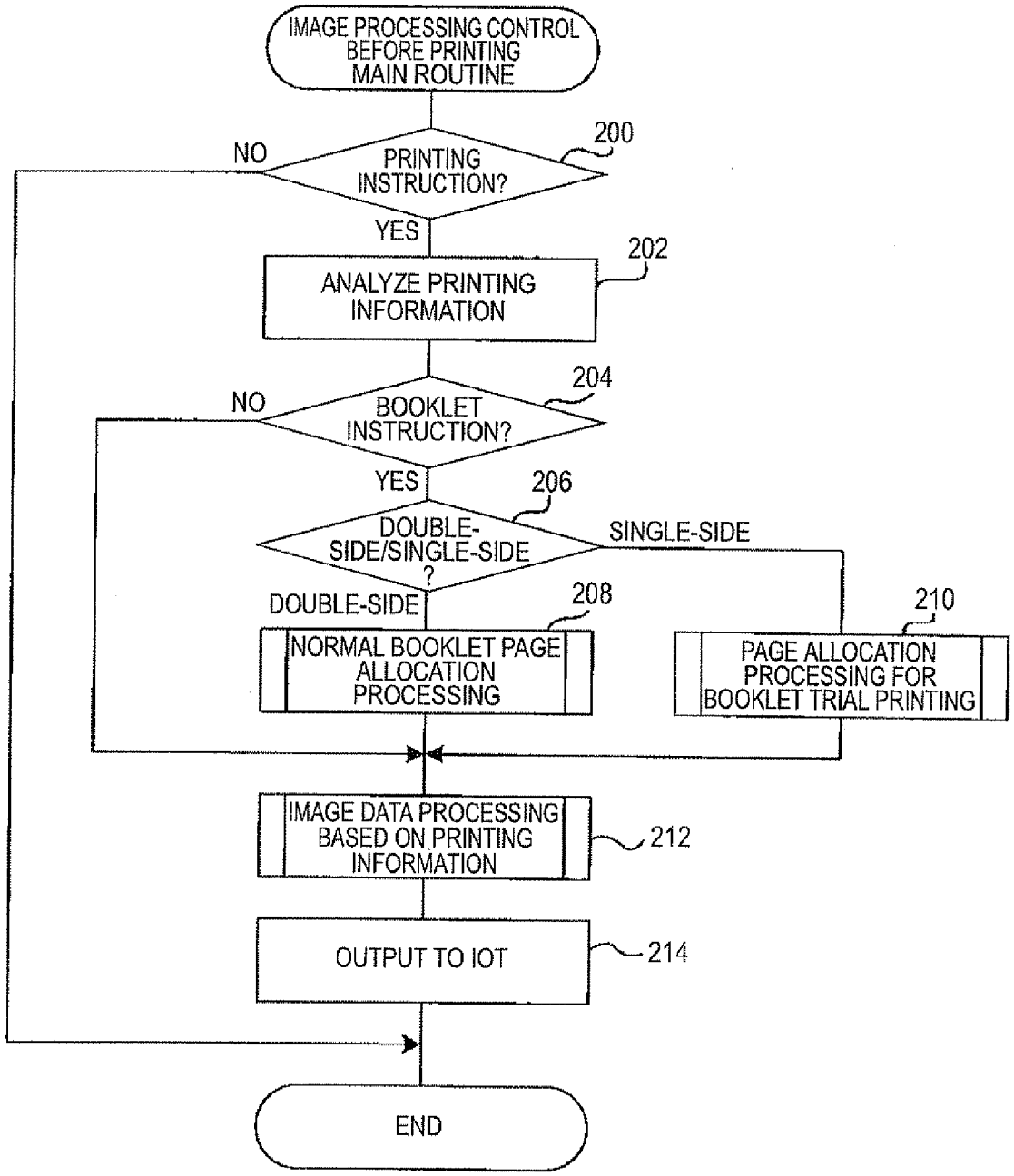
FIG. 7 is a flowchart showing a main routine for image processing control before printing according to this embodiment.

FIG. 7 shows a main routine for image processing control in the CPU 114 based on a printing instruction from the PC 132 (printer driver).

In Step 200, it is determined whether or not there is a printing instruction. When the determination is negative, the routine ends.

If the determination in Step 200 is positive, the process progresses to Step 202, and various printing information is analyzed. Next, the process progresses to Step 204, and it is determined from the analysis result whether or not there is an instruction of booklet printing.

When the determination in Step 204 is negative, no special page layout is carried out (there is no case where the page sequence is shifted). Thus, the process progresses to Step 212, and image data correction (gamma correction, sharpness correction, color correction, and RIP (Raster Image Processor)) processing is carried out on the basis of the received printing information. Next, the process progresses to Step 214, and the processing result is sent to the IOT.

When the determination in Step 204 is positive, that is, when booklet printing is designated, the process progresses from Step 204 to Step 206.

In Step 206, the designation of "double-side/single-side" printing is determined. When it is determined to be "double-side/booklet", the process progresses to Step 208, and when it is determined to be "single-side/booklet", the process progresses to Step 210, and corresponding page layout processing is carried out. Next, the process progresses to Step 212.

Figure 8:
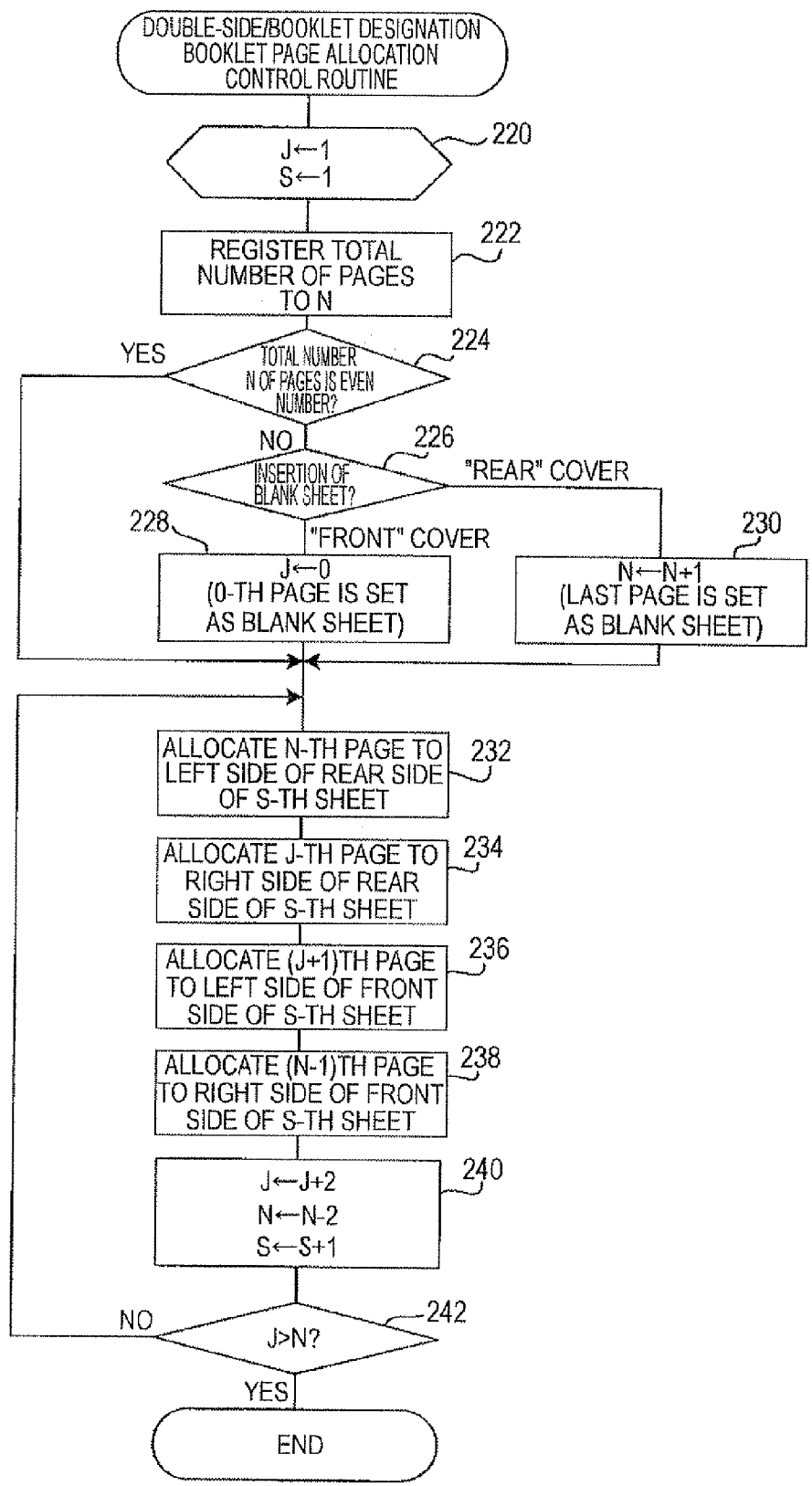
FIG. 8 is a flowchart showing a normal booklet page layout processing subroutine.

FIG. 8 shows a page layout processing routine for "double-side, booklet", that is, for normal booklet printing in Step 208 of FIG. 7.

In Step 220, initially, a variable J (page) is set to 1, and a variable S (the number of sheet) is set to 1. Next, in Step 222, the total number of pages (the maximum value of J) is registered to a variable N. Next, the process progresses to Step 224.

In Step 224, it is determined whether or not the total number N of pages is an even number. When the determination is negative, the process progresses to Step 226, and which of the first page ("front" cover) and the last page ("rear" cover) of the booklet to be set as a blank sheet is selected. With regard to this selection, any one of the first page and the last page may be set as a default value, or the user may select one of the first page and the last page by using the UI 120 or the like every time.

When in Step 226, the "front" cover is selected as being set as a blank sheet, the process progresses to Step 228, and the variable J is set to 0. Next, the process progresses to Step 232. When in Step 226, the "rear" cover is selected as being set as a blank sheet, the process progresses to Step 230, and the variable N is incremented (N←N+1). Next, the process progresses to Step 232.

In Step 232, the N-th page is laid out on the left side of the rear side of the S-th sheet. Next, the process progresses to Step 234, and the J-th page is laid out on the right side of the rear side of the S-th sheet. Next, the process progresses to Step 236.

In Step 236, the (J+1)th page is laid out on the left side of the front side of the S-th sheet. Next, the process progresses to Step 238, and the (N−1)th page is laid out on the right side of the front side of the S-th sheet. Next, the process progresses to Step 240. Thus, allocation for one sheet (four sides) is completed.

In Step 240, J is incremented by +2 (J←J+2), N is incremented by +2 (N←N+2), and S is set to +1 (S←S+1). Next, the process progresses to Step 242.

In Step 242, it is determined whether or not the current variable J exceeds the current variable N (J>N). When the determination is negative, the process returns to Step 232, and the above-described steps are repeated. If the determination in Step 242 is positive, the routine ends.

Figure 9:
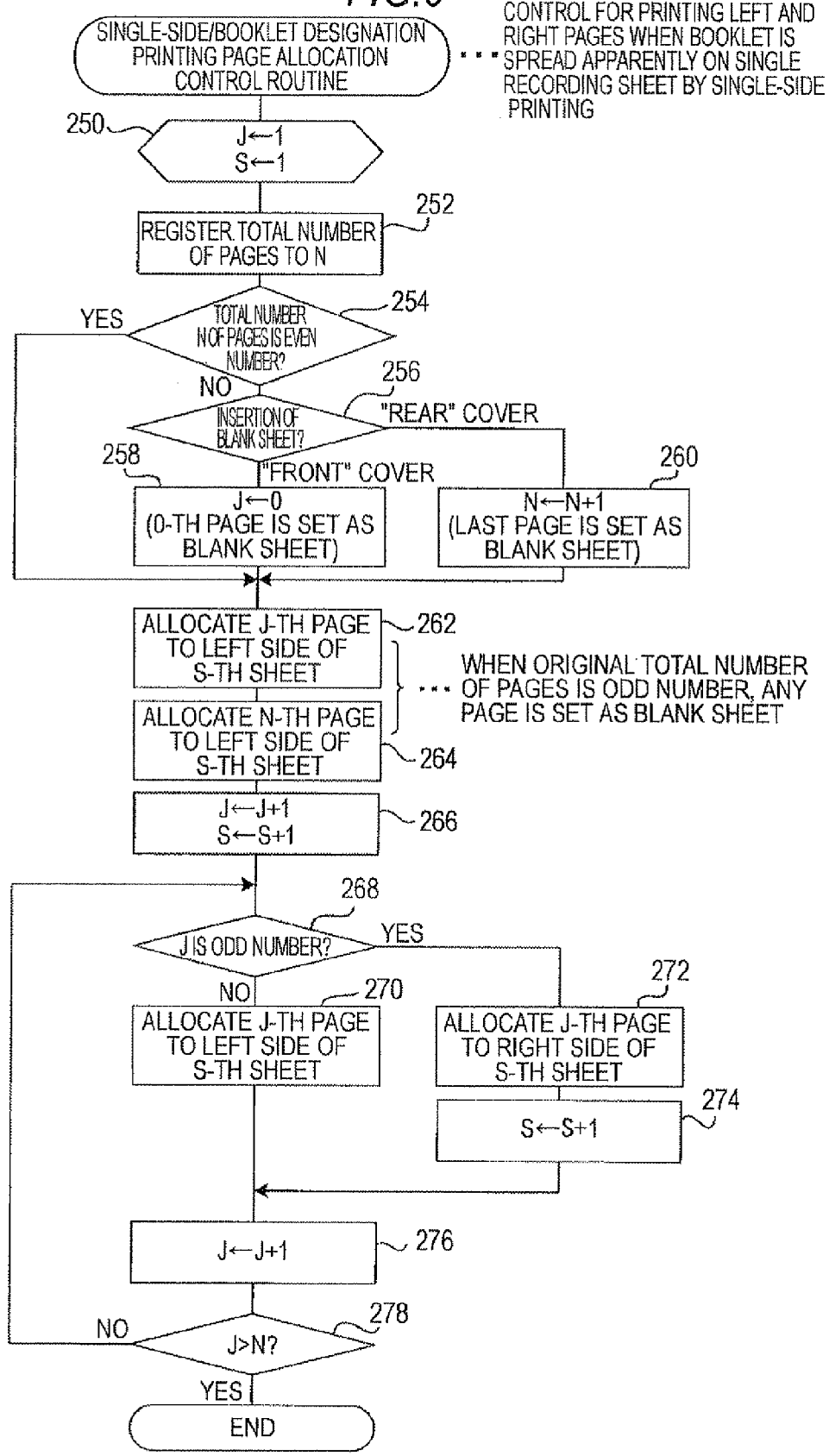
FIG. 9 is a flowchart showing a page layout processing subroutine for booklet trial printing.

FIG. 9 shows a page layout processing routine for "single-side, booklet", that is, for trial printing before booklet printing in Step 210 of FIG. 7.

In Step 250, initially, the variable J (page) is set to 1, and the variable S (the number of sheets) is set to 1. Next, in Step 252, the total number of pages (the maximum value of J) is registered to the variable N. Next, the process progresses to Step 254.

In Step 254, it is determined whether or not the total number N of pages is an even number. When the determination is negative, the process progresses to Step 256, and which of the first page ("front" cover) and the last page ("rear" cover) of the booklet to be set as a blank sheet is selected. With regard to this selection, any one of the first page and the last page may be set as a default value, or the user may select one of the first page and the last page by using the UT 120 or the like every time.

When in Step 256, the "front" cover is selected as being set as a blank sheet, the process progresses to Step 258, and the variable J is set to 0. Next, the process progresses to Step 262. When in Step 256, the "rear" cover is selected as being set as a blank sheet, the process progresses to Step 260, and the variable N is incremented (N←N+1). Next, the process progresses to Step 262.

In Step 262, the J-th page is laid out on the left side of the front side of the S-th sheet. Next, the process progresses to Step 264, and the N-th page is laid out on the right side of the front side of the S-th sheet. Since the S-th sheet, that is, the first sheet corresponds to the "front" cover and the "rear" cover when the booklet is created, the left and right pages are not connected.

Next, in Step 266, the variable J is incremented (J←J+1) and the variable S is incremented (S←S+1). Next, the process progresses to Step 268.

In Step 268, it is determined whether or not the variable J is an even number. When the determination is negative (it is determined to be an odd number), the process progresses to Step 270, and the J-th page is laid out on the left side of the front side of the S-th sheet. Next, the process progresses to Step 276. When the determination in Step 270 is positive (it is determined to be the even number), the process progresses to Step 272, and the J-th page is laid out on the right side of the front side of the S-th sheet. Next, the process progresses to Step 274, and the variable S is incremented. Next, the process progresses to Step 276.

In Step 276, the variable J is incremented. Next, the process progresses to Step 278.

In Step 278, it is determined whether or not the variable J exceeds the variable N (J>N). When the determination is negative, the process returns to Step 268, and the above-described steps are repeated. When the determination in Step 278 is positive, the routine ends.

In this embodiment, trial printing of the booklet is carried out only on one side (the front side or the rear side) of the recording sheet, and for example, when the recording sheets are arranged on the desk, connection of the left and right images is confirmed, and all the images are viewed without carrying out a turn-over operation. Alternatively, in order to reduce the number of recording sheets, double-side printing may be carried out, or two-page layout may be changed to four-page layout or eight-page layout.

(Modification)

Although in this embodiment, the image processing apparatus 100 as a multi-function apparatus for so-called office installment has been described, as the image processing apparatus 100, a printing apparatus for business capable of mass printing may be applied.

Figure 10:
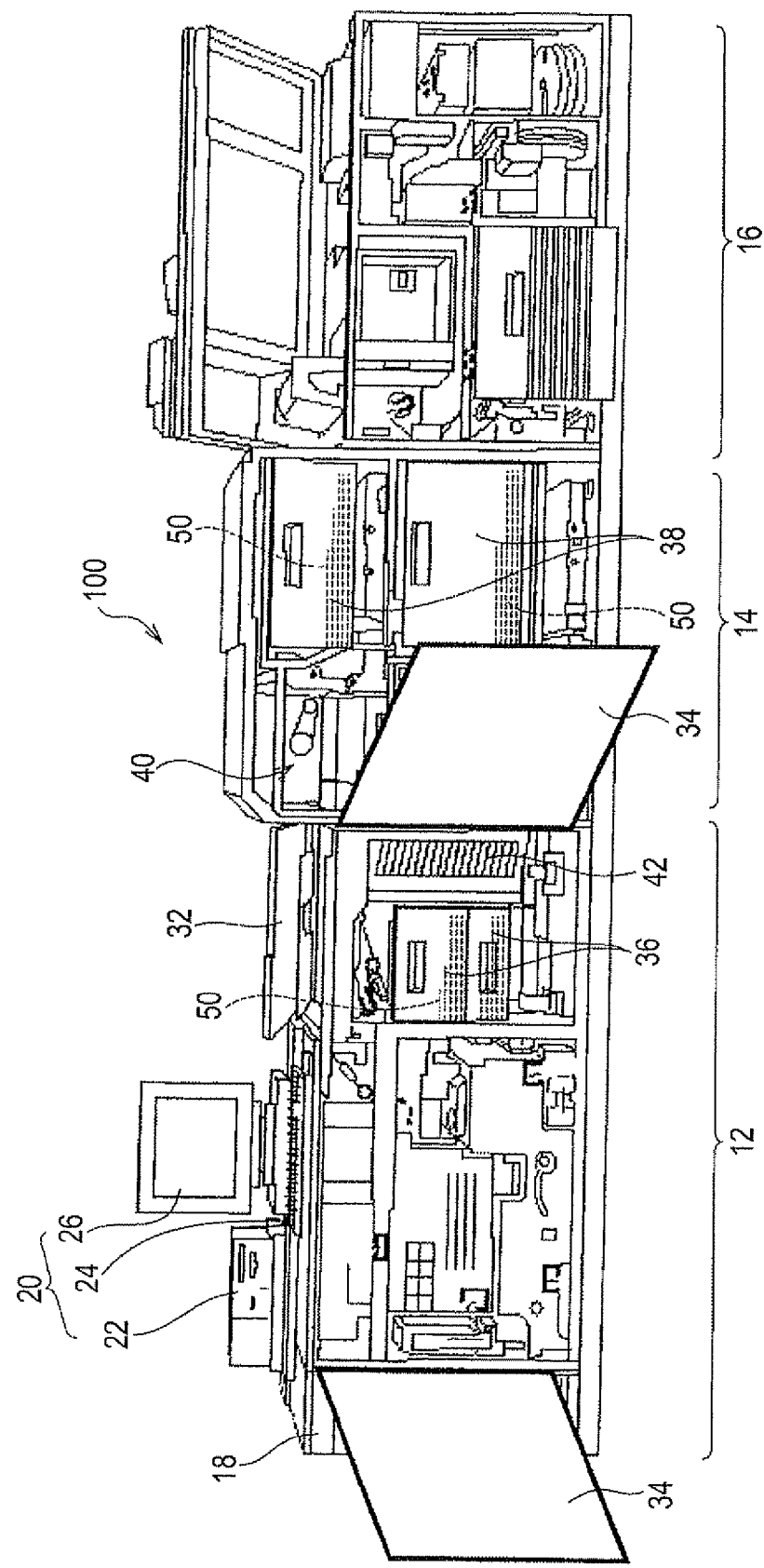
FIG. 10 is a schematic configuration diagram of an image processing apparatus (printing apparatus for key business) according to a modification.

FIG. 10 shows a printing apparatus 10 for key business according to a modification. The printing apparatus 10 for key business is broadly divided into an image forming section 12, a sheet storage section 14, and a post-processing section 16 from the left side of FIG. 10.

The image forming section 12 is provided with a main control section 20 that is provided at the upper surface of a housing 18 to perform overall control of the printing apparatus 10 for key business. The main control section 20 includes a control section body 22, a keyboard 24, and a display 26.

A rectangular opening is provided on the right side of the main control section 20 in FIG. 10 (at the upper surface of the image forming section 12). An opening/closing cover 32 is attached to the opening.

The image forming section 12 is covered with the housing 18, and includes an optical scanning section that scans an optical beam emitting light in accordance with image data from the main control section 20, a photosensitive drum that receives the optical beam scanned by the optical scanning section to form a so-called electrostatic latent image thereon, a developing section that supplies a developer, such as toner, to the electrostatic latent image on the photosensitive drum to carry out development, a transfer section that transfers an image visualized by the development to a recording sheet, and a fixing section that fixes the transferred image on the recording sheet. Hereinafter, a sequence of steps described above is referred to as "overall image forming processing". As occasion demands, "image forming processing" is called "printing".

In FIG. 10, the front side of the housing 18 in which the image forming section 12 is accommodated is open over the substantially entire region, and a pair of so-called casement type opening/closing doors 34 are attached thereto.

For this reason, at the time of maintenance of the image forming section 12, the pair of opening/closing doors 34 are opened, such that the maintenance work area having the substantially same area as the entire surface of the housing 18 is provided.

A recording sheet 50 that is fed to the transfer section of the image forming section 12 is selectively brought out of a tray 36 provided at the lower part of the opening/closing cover 32 or plural trays 38 provided in the sheet storage section 14. That is, the recording sheets 50 of different sizes (or the same size) can be stored in the plurality of trays 36 and 38. Anyone of the trays 36 and 38 is selected in accordance with an instruction from the image forming section 12 based on an instruction from the main control section 20, and then the recoding sheets 50 are brought out sequentially from the uppermost recording sheet 50.

The recording sheet 50 that is used in the foregoing embodiment is, for example, a business form sheet on which a predetermined image (recording sheet printed image) is printed in advance.

As shown in FIG. 10, the upper part of the sheet storage section 14 forms a transport section 40 that transports the recording sheet 50 printed by the image forming section 12. That is, when post-processing is needed, the recording sheet 50 printed by the image forming section 12 is transported to the post-processing section 16 through the transport section 40. The recording sheet 50 that is not subject to post-processing is discharged to a discharge tray unit 42 that is arranged at the lower part of the opening/closing cover 32.

The post-processing section 16 is also called, for example, a finisher section, and carries out processing, such as binding, stitching, punching, and folding, and sorting in units of job or copies.

Image data may be inverted vertically, changed in scale, or repeatedly used on the basis of the designated printing job attribute.

Although in this embodiment, the image processing apparatus or the printing apparatus for business which is mounted in a multi-function apparatus has been described as the page layout control device, an image processing apparatus which is mounted in an information processing apparatus, such as a computer, may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A page layout control device comprising:
a receiving unit that receives booklet designation information for printing two pages on each of both sides of a recording sheet and saddle-stitching as printing information for printing on a single recording sheet;
a booklet page layout processing unit that, when printing side information for designating a printing side of the recording sheet in the booklet designation information received by the receiving unit indicates double-sided printing, carries out page layout processing in which two pages are laid out on each of both sides of each recording sheet such that the pages are in a sequential order after a booklet is created; and
a trial page layout processing unit that, when printing side information for designating a printing side of the recording sheet in the booklet designation information received by the receiving unit indicates single-sided printing, carries out page layout processing in which two pages are laid out on a side of each recording sheet such that left and right images are printed on the side of each recording sheet in which the double-page spread is created, wherein
in the page layout processing, the trial page layout processing unit lays out the first page and the last page on a first recording sheet, and then lays out the remaining pages in a sequential order upon later recording sheets.

2. The page layout control device according to claim 1, wherein the trial page layout processing unit carries out page layout processing in which two pages are laid out on a single side of each recording sheet.

3. The page layout control device according to claim 1, wherein, when the total number of printing pages of the booklet designation information received by the receiving unit is an odd number, one of the first page and the last page when the booklet is created is printed only on a single side of the recording sheet on the basis of the form of the booklet.

4. The page layout control device according to claim 2, wherein, when the total number of printing pages of the booklet designation information received by the receiving unit is an odd number, one of the first page and the last page when the booklet is created is printed only on a single side of the recording sheet on the basis of the form of the booklet.

5. An image processing apparatus comprising:
a page layout control device including:
a receiving unit that receives booklet designation information for printing two pages on each of both sides of a recording sheet and saddle-stitching as printing information for printing on a single recording sheet;
a booklet page layout processing unit that, when printing side information for designating a printing side of the recording sheet in the booklet designation information received by the receiving unit indicates double-sided printing, carries out page layout processing in which two pages are laid out on each of both sides of each recording sheet such that the pages are in a sequential order after a booklet is created; and
a trial page layout processing unit that, when printing side information for designating a printing side of the recording sheet in the booklet designation information received by the receiving unit indicates single-sided printing, carries out page layout processing in which two pages are laid out on a side of each recording sheet such that left and right images are printed on the side of each recording sheet in which the double-page spread is created;
a printing execution instruction unit that provides instructions for printing execution on the basis of the booklet designation information received by the receiving unit and in accordance with page layout processed by one of the booklet page layout processing unit and the trial page layout processing unit; and
an image forming unit that forms an image on a recording sheet on the basis of the instructions for printing execution provided by the printing execution instruction unit, wherein in the page layout processing, the trial page layout processing unit lays out the first page and the last page on a first recording sheet, and then lays out the remaining pages in a sequential order upon later recording sheets.

6. The image processing apparatus according to claim 5, wherein the trial page layout processing unit carries out page layout processing in which two pages are laid out on a single side of each recording sheet.

7. The image processing apparatus according to claim 5, wherein, when the total number of printing pages of the booklet designation information received by the receiving unit is an odd number, one of the first page and the last page when the booklet is created is printed only on a single side of the recording sheet on the basis of the form of the booklet.

8. The image processing apparatus according to claim 6, wherein, when the total number of printing pages of the booklet designation information received by the receiving unit is an odd number, one of the first page and the last page when the booklet is created is printed only on a single side of the recording sheet on the basis of the form of the booklet.

9. The image processing apparatus according to claim 5, wherein the printing execution instruction unit further includes a notification unit that notifies trial printing in advance before an image is formed by the image forming unit when page layout is processed by the trial page layout processing unit.

10. A page layout control method comprising:
receiving booklet designation information for printing two pages on each of both sides of a recording sheet and saddle-stitching as printing information for printing on a single recording sheet;
when printing side information for designating a printing side of the recording sheet in the booklet designation information having been received indicates double-sided printing, carrying out page layout processing in which two pages are laid out on each of both sides of each recording sheet such that the pages are in a sequential order after a booklet is created; and
when printing side information for designating a printing side of the recording sheet in the booklet designation information having been received indicates single-sided printing, carrying out page layout processing in which two pages are laid out on a side of each recording sheet such that left and right images are printed on the side of each recording sheet in which the double-page spread is created, wherein
in the page layout processing, the first page and the last page are laid out on a first recording sheet, and then the remaining pages are laid out in a sequential order upon later recording sheets.

11. A non-transitory computer readable medium storing a program causing a computer to execute a process for page layout control, the process comprising:
receiving booklet designation information for printing two pages on each of both sides of a recording sheet and saddle-stitching as printing information for printing on a single recording sheet;
when printing side information for designating a printing side of the recording sheet in the booklet designation information having been received indicates double-sided printing, carrying out page layout processing in which two pages are laid out on each of both sides of each recording sheet such that the pages are in a sequential order after a booklet is created; and
when printing side information for designating a printing side of the recording sheet in the booklet designation information having been received indicates single-sided printing, carrying out page layout processing in which two pages are laid out on a side of each recording sheet such that left and right images are printed on the side of each recording sheet in which the double-page spread is created, wherein
in the page layout processing, the first page and the last page are laid out on a first recording sheet, and then the remaining pages are laid out in a sequential order upon later recording sheets.

12. The non-transitory computer readable medium according to claim 11,
wherein the page layout processing carries out page layout processing in which two pages are laid out on a single side of each recording sheet.

13. The non-transitory computer readable medium according to claim 11,
wherein, when the total number of printing pages of the received booklet designation information is an odd number, one of the first page and the last page when the booklet is created is printed only on a single side of the recording sheet on the basis of the form of the booklet.

14. The non-transitory computer readable medium according to claim 12,
wherein, when the total number of printing pages of the received booklet designation information is an odd number, one of the first page and the last page when the booklet is created is printed only on a single side of the recording sheet on the basis of the form of the booklet.

* * * * *